United States Patent

[11] 3,622,554

[72] Inventors Erich Behr
Troisdorf;
Rolf Beckmann, Seigburg, both of Germany
[21] Appl. No. 614,823
[22] Filed Feb. 9, 1967
[45] Patented Nov. 23, 1971
[73] Assignee Veba-Chemie AG, Gelsenkirchen
Buer, Germany
[32] Priority Feb. 14, 1966
[33] Germany
[31] D 49359

[54] PRODUCTION OF CROSS-LINKED POLYETHYLENE FLOCK
6 Claims, No Drawings

[52] U.S. Cl................................................. 260/2.5,
260/94.9 G
[51] Int. Cl......................................................... C08f 47/10
[50] Field of Search............................................ 260/94.9 G

[56] References Cited
UNITED STATES PATENTS

| | | | |
|---|---|---|---|
| 3,452,123 | 6/1969 | Beckmann et al. ........... | 264/53 |
| 2,990,381 | 6/1961 | Meinel ......................... | 260/2.5 |
| 3,079,370 | 2/1963 | Precopio et al.............. | 260/94.9 |
| 3,275,577 | 9/1966 | Hoeg et al..................... | 260/2.5 |
| 3,098,831 | 7/1963 | Carr ............................. | 260/2.5 |
| 3,098,832 | 7/1963 | Pooley et al. ................. | 260/2.5 |
| 3,062,759 | 11/1962 | Bingham et al. .............. | 260/2.5 |

*Primary Examiner*—Joseph L. Schofer
*Assistant Examiner*—Richard A. Gaither
*Attorney*—Burgess, Dinklage & Sprung

ABSTRACT: Production of cross-linked polyethylene flock by introducing a cross-linking agent and polyethylene into a zone under pressure and under a temperature sufficiently high to support cross-linking of the polyethylene and then abruptly releasing the pressure whereby a cross-linked polyethylene flocculent material is formed.

PRODUCTION OF CROSS-LINKED POLYETHYLENE FLOCK

This invention relates to the cross-linking of polyethylene. It more particularly refers to the production of very low-bulk density cross-linked polyethylene.

This specification discloses the peroxide cross-linking of high and low density polyethylene under pressure followed by an abrupt pressure reduction which induces a foamlike expansion in the product to produce a flocculent material.

It is well known to cross-link polyolefins, and particularly polyethylene, with peroxides, particularly organic peroxides. It is important to provide uniform distribution of the peroxide cross-linking agent in the polyethylene in order to impart uniform cross-linking thereto. It is generally conceded that this uniform distribution is best accomplished by operating in the fused state, that is by admixing a suitable peroxide with fused polyethylene.

Unfortunately, the melting points of polyethylenes are such that at these temperatures the usable peroxides have a tendency to break down into free radicals and thus cause premature cross-linking in a nonuniform manner. The premature cross-linking results in a simultaneous increase in viscosity of the molten polyethylene which causes further difficulty in uniformly distributing the peroxide. In order to overcome the increased viscosity and attempt to uniformly distribute the peroxide cross-linking agent, increased agitation has been employed but this generally results in increasing the temperature of the melt by friction thus aggravating the already bad situation and causing scorching, lumping and searing of the melt accompanied by some polymer degradation. Such products are substantially unmarketable as first-class material.

Attempts have been made to rectify this situation by applying the cross-linking agent to a shaped polyethylene article after such has been formed. This avoids the above set forth problems, but also results in a nonuniformly cross-linked product.

Foam-form polyethylene is a desirable product which has been produced by the use of suitable blowing agents in combination with fused polymer. Although it has been possible to cross-link such foam after forming, such product is subject to the same nonuniformity as has been discussed above. Attempts to cross-link and foam simultaneously through the use of blowing and cross-linking agents simultaneously admixed with molten polymers have not been successful. One of the problems in providing such a cross-linked foam is that the blowing agent must have a decomposition temperature which is higher than the melting point of the polymer but lower than the decomposition temperature of the cross-linking peroxide.

It is therefor an object of this invention to provide an improved process for the production of low-bulk density cross-linked polyethylene.

It is another object of this invention to provide a novel process for producing cross-linked polyethylene.

Other and additional objects of this invention will become apparent from a consideration of this entire specification including the claims appended thereto.

In accord with and fulfilling these objects, one aspect of this invention resides in a process comprising melting polyethylene in a pressurizable mill or kneader; adding peroxide cross-linking agent; working the mass until cross-linking is complete; and abruptly releasing the pressure. Upon release of the pressure, a finely flocculent, white product is produced.

The pressure required for the process of this invention is preferably provided by filling the mill or kneader to at least 65 full capacity with polyethylene such that closing the cover of the mill or kneader imparts a pressure upon the polyethylene. The progress of the cross-linking process can be followed by measuring the increase in viscosity of the melt since as the degree of cross-linking increases so does the viscosity of the polyethylene melt. As the viscosity of the melt increases, greater kneading power is required thus drawing larger amperage which is itself a measure of the degree of cross-linking. Since it has been found that the cross-linking process is accelerated by increasing the kneading speed, it is preferred to increase this speed as cross-linking proceeds thus requiring still further increase in power input to the kneader. It is also preferred to raise the temperature of the melt after mixture of the peroxide therewith in order to accelerate cross-linking.

The product of the process of this invention may be dried in order to remove any of the peroxide decomposition products therefrom which may be undesirable.

In contrast to the starting polyethylene, the product is insoluble in all known solvents. The melting range of the flocks is usually 50° to 100° C. higher than the melting range of the starting product, depending on the type of polyethylene used. The flocks can also be compressed at low temperatures under high pressure to form porous boards, or to bond them to solid polyethylene boards or other articles.

The flocks possess a bulk weight of 0.2 to 0.3 g./cm$^3$.

All known polyethylenes and ethylene copolymers having densities of 0.92 to 0.965 are suitable for this process.

The peroxides commonly used for the cross-linking of polyethylenes are used as the peroxides in this process, that is, mainly dialkyl peroxides or, for example, dicumyl peroxide. The amount of peroxide required depends to some extent on the polymer that is to be cross-linked. Low-density polyethylene runs between 2.5 and 6 wt. percent. High-density polyethylene runs between 3.5 and 6 wt. percent. The greater the amount of peroxide that is used, the finer and more uniform the flocks of the resulting product will be.

The melting temperature runs around 110° to 120° C. for a low-density polyethylene, and around 130° to 140° C. for a high-density polyethylene. It is best to operate on the two-current principle, i.e., one thermostat is set to the plastification temperature, and another to the cross-linking temperature (150° to 190°), and the temperature control of the kneader is switched to the second thermostat after the plastification and the working in of the peroxide. The process is preferably carried out at elevated pressures.

The thermal and chemical stability of the product makes it suitable for various insulating purposes, as for example, for hot water insulation, and also for insulation against cold and noise. On account of its excellent electrical properties, the product can be used for various purposes in the electrical industry, as for example, for use as a dielectric separating layer in cable insulation. Also, compressed and densified flocks can be used as liquid or gas filters having special resistance to chemicals. Molded insulators can also be made by pressing.

This invention is illustrated by the following example which is in no way limiting thereon.

EXAMPLE

The experimental conditions are adapted to the kneading apparatus available in each case. Polyethylene having a density of 0.918 at 120° C. are plasticized in a Brabender plastograph equipped with a cam kneader and pressure piston. After the addition of the peroxide (dicumyl peroxide) the temperature is raised to 180° C. After the maximum viscosity has been passed, the mixture is pressure-relieved by removing the pressure piston.

The following table shows the bulk weight of the products obtained by the addition of various amounts of peroxide.

TABLE

| Amount of Peroxide (% by weight) | Bulk Weight of the Flocks using Polyethylene Density 0.918 in g./cm.$^3$. | Polyethylene Density 0.955 in g./cm.$^3$. |
| --- | --- | --- |
| 2.5% | 0.22 | 0.33 |
| 3 | 0.19 | 0.30 |
| 3.5 | 0.25 | 0.28 |
| 4 | 0.34 | 0.28 |
| 4.5 | 0.32 | |
| 5 | 0.28 | 0.27 |
| 6 | 0.29 | |

What is claimed is:
1. In the process of cross-linking and foaming polyethylene through the admixture of organic peroxides with molten polymer and working said mixture at elevated temperatures; the improvement which comprises carrying out said cross-linking under elevated pressure at a temperature above the decomposition temperature of said peroxide, and then abruptly releasing said pressure after substantial completion of said cross-link whereby to form flocculent polyethylene foam which pressure release is solely responsible for said foaming and flocculation.
2. The improved process claimed in claim 1, wherein said polymer is polyethylene having a density of about 0.92 to 0.965 gram per cubic centimeter.
3. The improved process claimed in claim 1, wherein said peroxide is dicumyl peroxide.
4. The improved process claimed in claim 1, wherein said peroxide is present in proportion of about 2.5 to 6 weight percent.
5. The improved process claimed in claim 1, carried out at about 150° to 190° C.
6. The improved process claimed in claim 1, wherein the product bulk density is about 0.2 to 0.3 gram per cubic centimeter.

* * * * *